March 4, 1969  D. L. LAFUZE  3,431,483
CYCLOCONVERTER POWER CIRCUITS
Filed Dec. 30, 1966  Sheet 1 of 11

INVENTOR.
DAVID L. LAFUZE
BY
HIS ATTORNEY

March 4, 1969     D. L. LAFUZE     3,431,483
CYCLOCONVERTER POWER CIRCUITS
Filed Dec. 30, 1966     Sheet 3 of 11
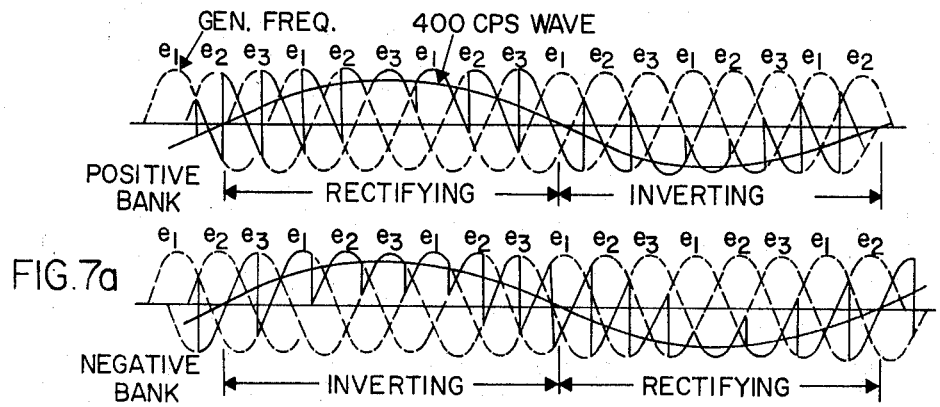
FIG. 7
FIG. 7a
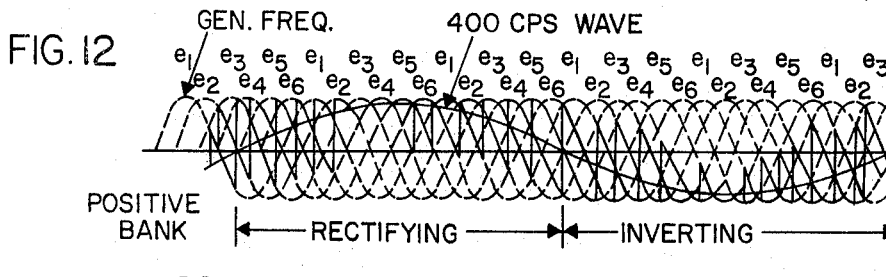
FIG. 12
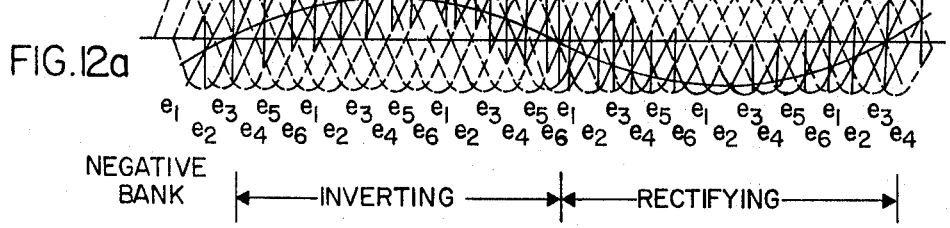
FIG. 12a
INVENTOR.
DAVID L. LAFUZE
BY
HIS ATTORNEY RIPPLE AT 90° RETARD
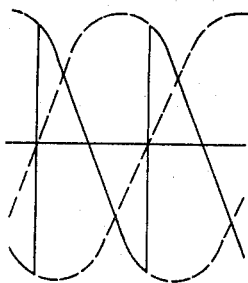
3∅
FIG. 8
RIPPLE AT 90° RETARD
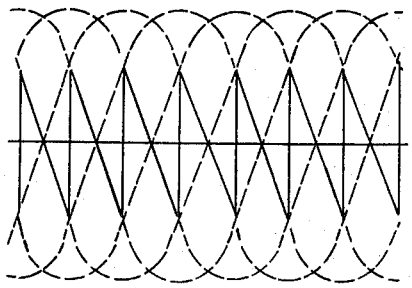
6∅
FIG. 8a
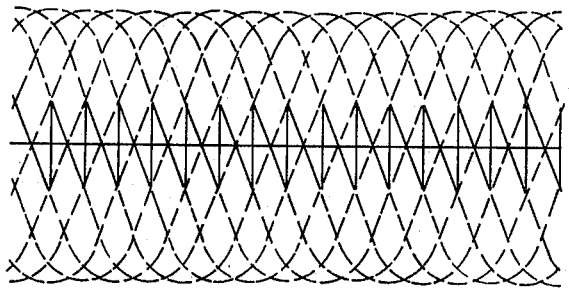
FIG. 8b 9∅
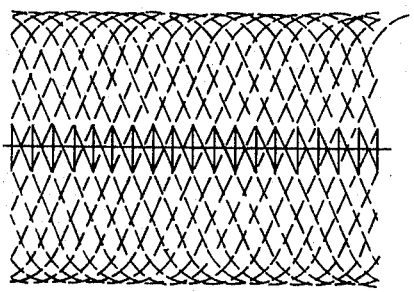
12∅
FIG. 8c
*INVENTOR.*
DAVID L. LAFUZE
BY
HIS ATTORNEY March 4, 1969    D. L. LAFUZE    3,431,483
CYCLOCONVERTER POWER CIRCUITS
Filed Dec. 30, 1966    Sheet 5 of 11

POSITIVE RECTIFIER BANK, PHASE A

NEGATIVE RECTIFIER BANK, PHASE A    FIG. 10a

PHASE A CURRENT

INVENTOR.
DAVID L. LAFUZE
BY
HIS ATTORNEY

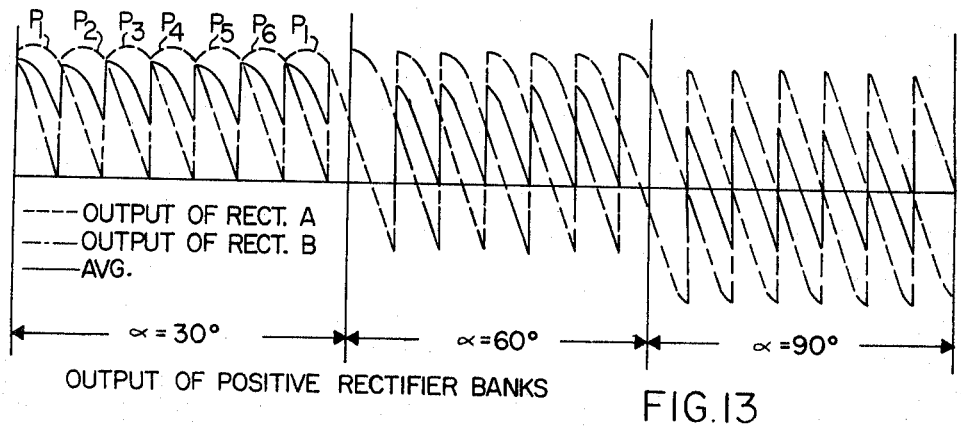
FIG.13 — OUTPUT OF POSITIVE RECTIFIER BANKS
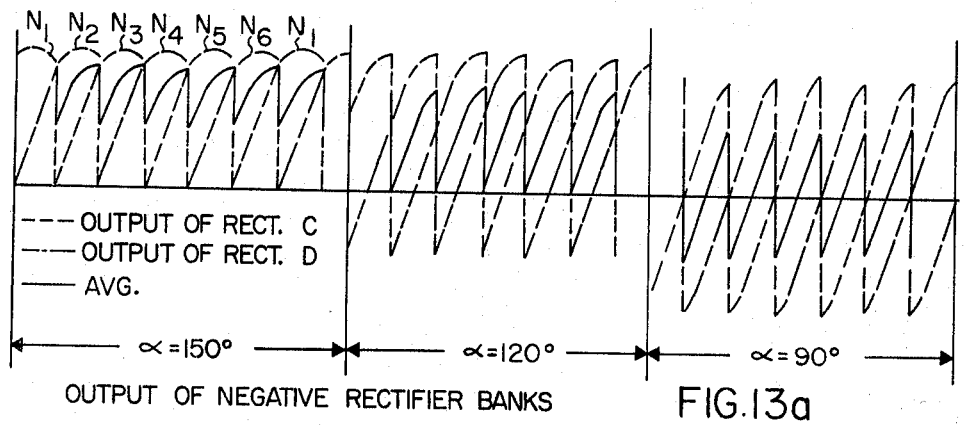
FIG.13a — OUTPUT OF NEGATIVE RECTIFIER BANKS
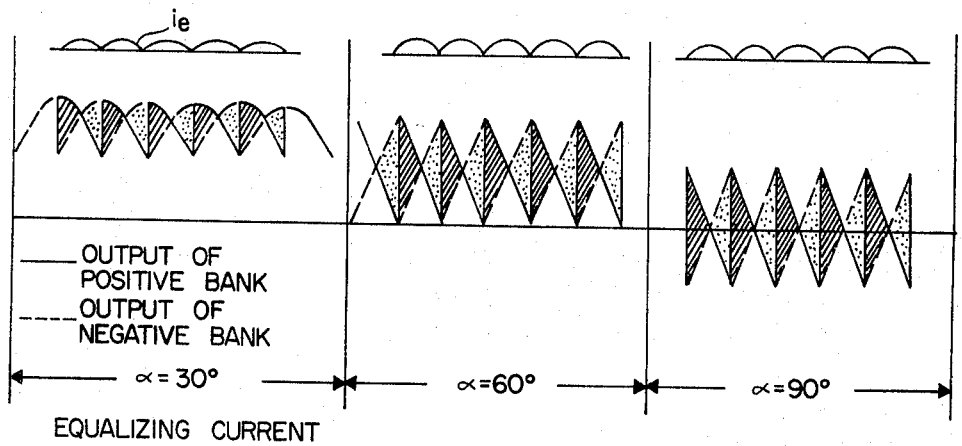
FIG.13b — EQUALIZING CURRENT
INVENTOR.
DAVID L. LAFUZE
HIS ATTORNEY

United States Patent Office 3,431,483
Patented Mar. 4, 1969

3,431,483
CYCLOCONVERTER POWER CIRCUITS
David L. Lafuze, Waynesboro, Va., assignor to General
Electric Company, a corporation of New York
Filed Dec. 30, 1966, Ser. No. 606,365
U.S. Cl. 321—7                    23 Claims
Int. Cl. H02m 5/16

ABSTRACT OF THE DISCLOSURE

New, static cycloconverter power circuits are described which use interphase reactor windings to interconnect the outputs of selected numbers of phase controlled silicon controlled rectifiers into appropriate groupings within positive and negative banks of such rectifiers. By gating on the phase controlled SCR's in a proper sequence, high ripple frequencies are obtained in the output together with extended conduction intervals for the phase controlled SCR's. In this manner, highly efficient, large power rated cycloconverters can be constructed with a minimum weight of filter components and transmission line interconnections for a given output power rating.

---

This invention relates to new and improved cycloconverters and static cycloconverter power circuits using interphase windings.

More particularly, the invention relates to new, static, cycloconverter power circuits using interphase windings to interconnect the outputs of selected numbers of phase controlled silicon controlled rectifiers into groups within positive and negative banks. The SCR's are then gated-on in a manner to obtain high output ripple frequencies together with extended conduction intervals for the phase controlled silicon controlled rectifiers within a minimum weight of filter components and transmission line interconnections for a given output power rating.

A cycloconverter is an apparatus for converting alternating current electric energy having a given form into alternating current electric energy having a different form. For example, a cycloconverter can be used to convert a variable frequency alternating current such as derived from an alternator driven from the drive shaft of an automotive or aircraft engine into a fixed or selected varying frequency alternating current for operating auxiliary equipment. Alternatively, cycloconverters are used to convert fixed frequency, single phase alternating current into three or more phases, or for converting multiphase alternating current into fewer or more phases, such as six phase AC into three phase AC.

Cycloconverters can also be used to convert or regulate voltage or current magnitudes. In many cases, cycloconverters are employed to convert the frequency, phase voltage and current of a supply alternating current into a desired output alternating current wherein all of these characteristics are adjusted to predetermined values.

Static cycloconverters employing silicon controlled rectifiers as power switching elements are used throughout industry. The known static cycloconverters, however, possess certain undesirable features that make their use in certain types of applications impractical. One of these undesirable features is the disproportionally greater weight of the filtering components required at the output end of the cycloconverter. Because of this added weight, use of the known cycloconverters in the power supply systems of certain types of aircraft, guided missiles, etc. becomes problematical. To overcome this problem the present invention was devised.

It is therefore a primary object of the present invention to provide new and improved cycloconverters and static cycloconverter power circuits having greatly reduced weight.

Another object of the invention is the provision of such reduced weight cycloconverters and static cycloconverter power circuits wherein the efficiency of utilization of the rectifier components is maintained and/or improved to thereby maintain and/or improve the efficiency of operation of the overall cycloconverter system.

In practicing the invention, a new and improved cycloconverter and static cycloconverter power circuit is provided which comprises an arrangement of gate control switch means for each phase of a multiphase alternating current power source. Phase controlled gating circuit means are provided which are coupled to the multiphase alternating current source and are connected to the gate controlled switch means for gating on selected ones of the gate controlled switch means to cause the same to conduct current therethrough at selected points in the phase of the alternating voltage supplied thereto. Interphase winding means are provided which interconnect groups of selected numbers of the gate controlled switch means with the selected number being determined by the number of phases of the supply alternating current employed to energize the circuit and the desired period of conduction for each of the gate controlled switch means. The circuit is completed by output circuit means which are coupled to the interphase winding means for deriving the converted output alternating current.

Another object of the present invention is to provide a more efficient cycloconverter by intercoupling groups of selected power switching devices with transformer means to maintain a high output ripple frequency while providing a longer duty cycle for the power switching devices.

Another object is to provide a cycloconverter having a small generator and transmission leads by making more efficient use of the converter switching elements.

A further object of the present invention is to provide a lighter weight cycloconverter by intercoupling selected groups of power switching devices with transformer means to obtain a longer duty cycle for the power switching devices for the same output ripple frequency so that a small generator and smaller transmission lines can be used.

In preferred embodiments of the invention, the gate controlled switch means comprise sets of parallel connected, gate controlled conducting devices for supplying output current in both directions and the interphase winding means is comprised by first interphase winding means interconnecting selected first groups of gate controlled conducting devices for supplying output current in a first direction and second interphase winding means interconnecting selected second groups of gate controlled conducting devices for supplying output current in the opposite direction. The circuit is completed by conductively interconnecting the first and second interphase winding means. The gate controlled conducting devices employed in the circuit preferably comprise silicon controlled rectifiers, and the output circuit means preferably includes filter means comprise in whole or in part by leakage reactance of the first and second interphase winding means.

Other objects, features and many of the attendant advantages of this invention will be better understood after a reading of the following written description, considered in connection with the accompanying drawings, wherein:

FIGURE 7 is a two-part characteristic curve plotting voltage versus time and illustrating the operating characteristics of the complete, static cycloconverter circuit shown in FIGURE 6;

FIGURE 8 is a series of voltage versus time characteristic curves illustrating the desirable effect of increasing the number of input phases and silicon controlled rectifiers to reduce the amplitude and increase the frequency of the output ripple developed by a static, cycloconverter power circuit;

FIGURE 12 is a series of voltage versus time characteristic curves illustrating the manner of operation of the static cycloconverter power circuit shown in FIGURE 11;

FIGURE 13 is a greatly magnified view of the voltage versus time and equalizing current versus time operating characteristic of the circuit shown in FIGURE 11, and illustrates the extended conducting intervals for the switching power SCR's that can be obtained with the circuit for gating fixed phase delay angles of 30 degrees, 60 degrees and 90 degrees;

Figure 16:
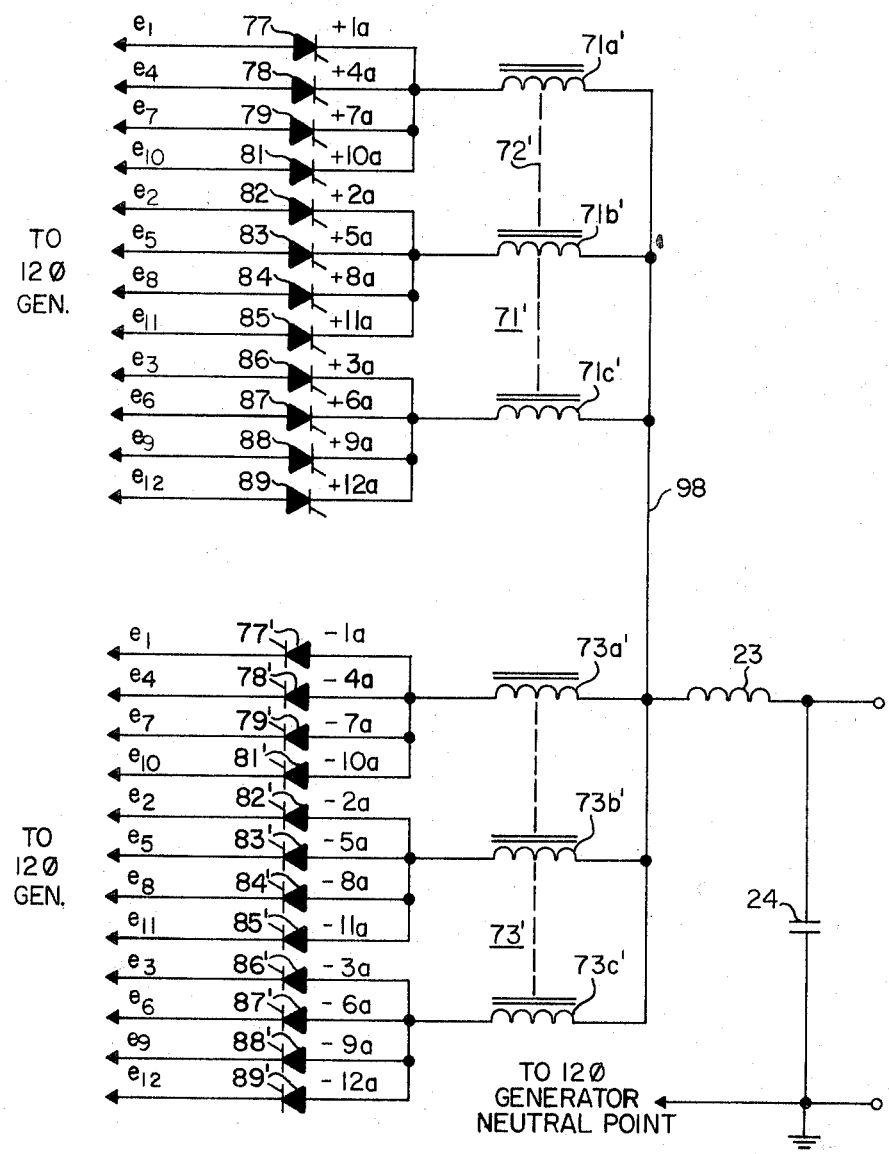
Figure 17:
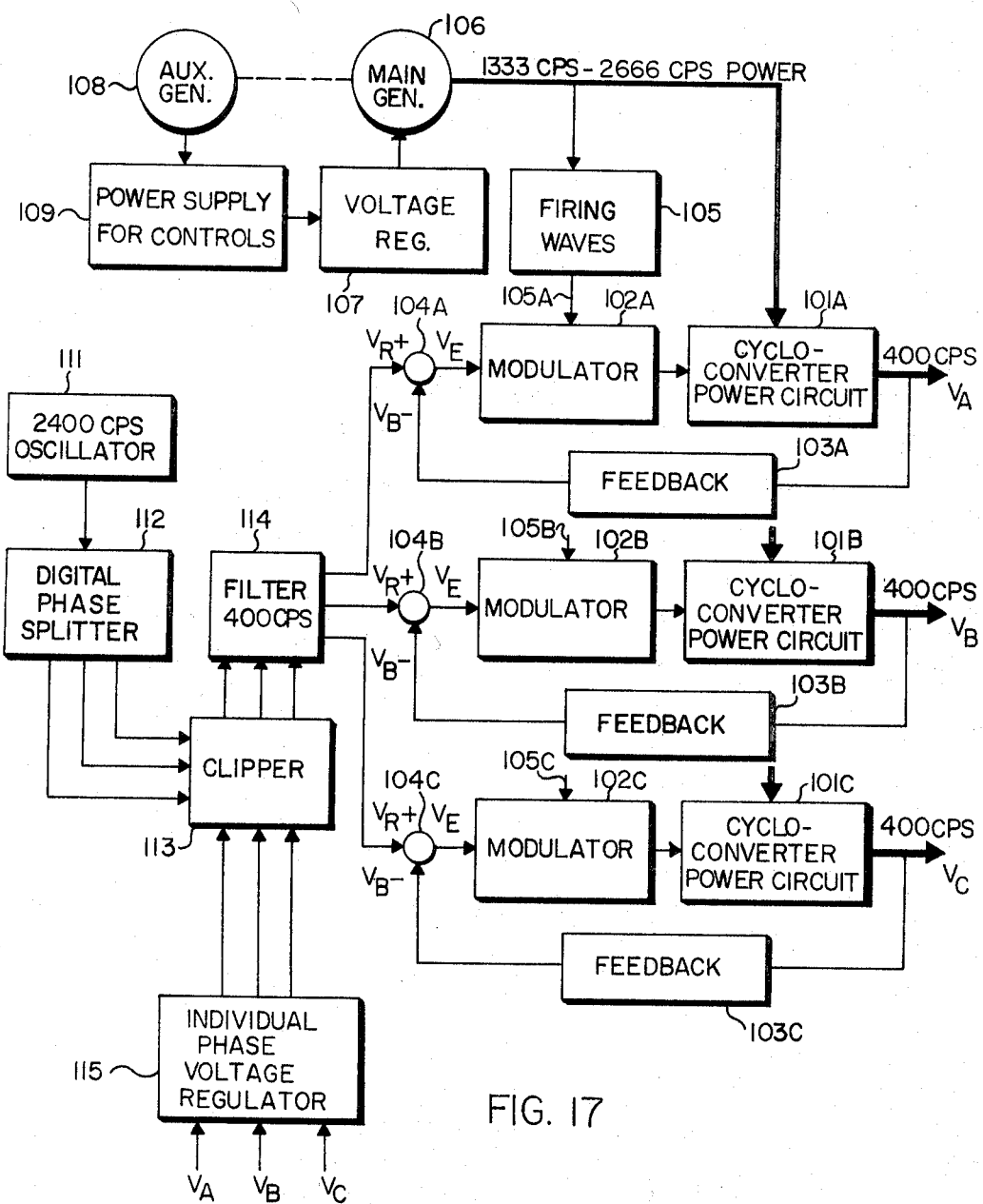

FIGURE 16 is a schematic circuit diagram of a twelve phase, static cycloconverter power circuit providing 90 degree conduction for the switching power SCR's and constructed in accordance with the invention; and FIGURE 17 is a functional block diagram of a complete cycloconverter constructed in accordance with the invention, and providing a 400 cycle per second, three phase output from a six phase, variable frequency supply.

Figure 1:
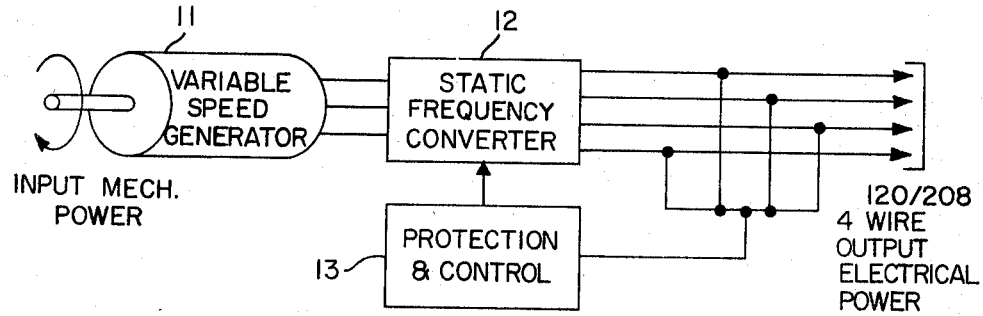
FIGURE 1 is a functional block diagram illustrating the components of a typical conventional cycloconverter system.

FIGURE 1 is a functional block diagram of a typical, conventional cycloconverter for converting three phase, variable frequency alternating current power into three phase, fixed frequency, alternating current power having a neutral conductor. The cycloconverter shown in FIGURE 1 is comprised by a variable speed, rotating, alternating current generatotr 11 developing three phase, variable frequency alternating current (hereinafter referred to as AC) that is supplied to a static frequency converter 12. The static frequency converter 12 converts the variable frequency, three phase AC from the variable speed generator 11 to a three phase, fixed frequency AC with neutral connection. The static frequency converter 12 is controlled by a protection and control circuit 13 having feedback potentials supplied thereto from the output of the static frequency converter 12. From a consideration of FIGURE 1 it will be seen that the cycloconverter in effect operates to convert alternating current of one form into alternating current of a different desired form.

Figure 2:
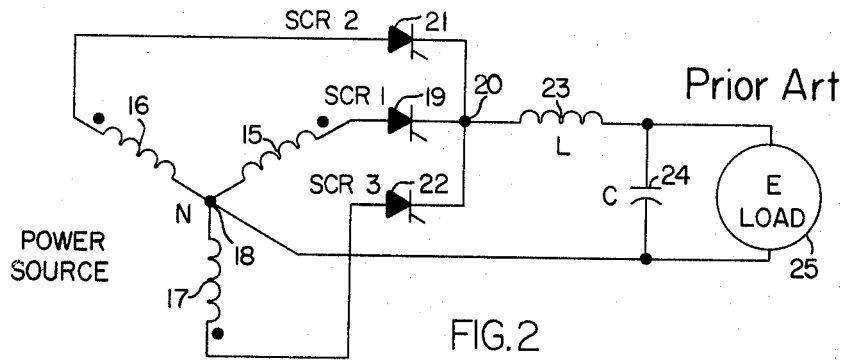
FIGURE 2 is a schematic circuit diagram of one half (arbitrarily termed the positive half) of one form of a three phase, static cycloconverter power circuit.

FIGURE 2 is a schematic circuit diagram of one form of a static cycloconverter power circuit, but shows only one half of the cycloconverter power circuit to simplify the following explanation. The circuit of FIGURE 2 is comprised by a three phase source of AC formed by windings 15, 16 and 17 with each of the windings having one of its terminals connected to a common neutral point 18 that is generally grounded. The windings 15, 16 and 17 may comprise the windings of a three phase supply transformer or the stator windings of a three phase alternator such as shown at 11 in FIGURE 1. Each of the remaining free terminals of the windings 15, 16 and 17 is connected to the anodes of the respective gated switch means formed by silicon controlled rectifiers 19, 21 and 22. The silicon controlled rectifiers 19, 21 and 22 have their cathodes connected in common to an output circuit comprised by a filter inductor 23, capacitor 24 and a load 25. The silicon controlled rectifier (hereinafter referred to as an SCR) is a solid state n-p-n-p semiconductor thyristor device having three exposed layers which are conveniently termed its anode, cathode and control gate terminals. The SCR is capable of blocking current flow in the reverse direction and of being gated into conduction in the forward direction by the application of a suitable low voltage signal level gating potential applied to its gating terminal simultaneously with the application of an enabling firing supply potential of the proper polarity across its anode and cathode terminals. For a more complete description of the SCR, reference is made to the silicon controlled Rectifier Manual, third edition, published by the Semiconductor Products Department of the General Electric Company located at Electronics Park in Syracuse, N.Y.

For the purpose of simplifying the following explanation, the gating circuit that would be connected to the control gate of the SCR's 19, 21 and 22 in FIGURE 2 are not shown. It will be assumed however that the gating circuits are capable of applying a gating-on signal potential to the control electrode of the SCR's at an appropriate point as described hereinafter so as to cause the respective SCR to be gated on to conduct over the full 180 degree range of the positive half cycle of the alternating current, enabling firing potential supplied thereacross. Other assumptions are as follows:

(1) The power source is a stiff (zero impedance) source of three phase power with sinusoidal waveshape.

(2) The SCR's 19, 21 and 22 are perfect switches; that is they turn on instantly when gated to zero forward voltage drop and carry no reverse current.

(3) The filter inductor 23 and capacitor 24 are sufficiently large so that the voltage across the load is a smooth direct voltage.

(4) The load is a back EMF load of magnitude equal to the average direct current voltage from the phase controlled silicon controlled rectifiers.

It should be noted that it is a characteristic of the SCR's 19, 21 and 22 that they can conduct current only when the voltage applied across the anode-cathode terminals thereof is in the forward direction (i.e., when the anode is positive with respect to the cathode) but during the alternate half cycle, when the devices are back biased (i.e., the cathode is positive with respect to the anode terminal), the SCR's are incapable of being rendered conductive. It follows from this that the SCR's 19, 21 and 22 can be rendered conductive only during the positive half cycles of the line-to-line voltage supplied thereacross by their respective associated three phase windings 15, 16 and 17 when measured with respect to point 20. During the alternate half cycle when the SCR's 19, 21 and 22 are reverse biased, they cannot be turned on.

Figure 3:
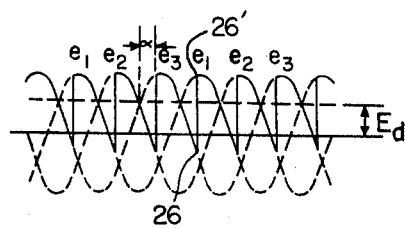
FIGURE 3 is a voltage versus time characteristic curve illustrating one mode of operation of the static cycloconverter power circuit shown in FIGURE 2.

FIGURE 3 of the drawings is a voltage versus time characteristic curve illustrating one mode of operation (known as the rectifying mode) of the cycloconverter power circuit arrangement shown in FIGURE 2. In FIGURE 3, the three phase line-to-neutral voltages $e_1$, $e_2$ and $e_3$ supplied across the SCR's 19, 21 and 22 by windings 15, 16 and 17, respectively, are shown in dotted outline form. The pulsed voltage developed across the output LC filter 23, 24 and load 25 is shown by the solid lines for a gating phase delay angle $\alpha$ equal approximately 50 degrees. The gating phase delay angle $\alpha$ is the angle in the phase of the alternating voltage supplied across the anode-cathode terminals of the respective SCR's 19, 21 and 22 at which the SCR is gated into a conducting condition by the application of a gating-on signal applied to its gating electrode. The solid line shown in FIGURE 3 results since each SCR when it is gated on at angle $\alpha$, turns on and supplies a more positive voltage to the LC filter 23, 24 and load 25 than the previously conducting SCR which is then rendered nonconducting.

The phenomenon of turning off the previously conducting SCR is referred to as commutation, and is necessary in order that the SCR can be restored to its nonconducting, current blocking condition where it again can be controlled by the application of a gating-on signal to its gating electrode. For example, assume that the SCR 22 is the previously conducting SCR at the time that the SCR 19 is gated on. From an examination of FIGURE 3, it will be seen that this occurs at the point 26. By referring to FIGURE 2 in conjunction with FIGURE 3, it will be seen that at point 26, which represents the voltage appearing at the dot end of the winding 17, the voltage appearing at the dot end of winding 15 shown at 26' in FIGURE 3 is considerably more positive than the voltage appearing at the dot end of the winding 17. Thus, it will be appreciated that at the time of turn-on of the SCR 19, the considerably more positive voltage shown at point 26' and appearing at the dot end of the winding 15, will be applied through SCR 19 (which is now conducting) back across the SCR 22. This results in reverse biasing SCR 22 and causes it to be commutated off. This commutation phenomenon begins simultaneously with the turn-on of each of the SCR's 19, 21 and 22 throughout the successive, positive half cycle of the respective three phase supply alternating current potentials applied across the SCR's 19, 21 and 22.

The output LC filter 23, 24 serves to integrate the pulsed waveform potential supplied thereto and shown in solid line in FIGURE 3 to provide an average output potential $E_d$. By observation of FIGURE 3, it will be appreciated that a smaller gating phase delay angle $\alpha$ would produce a more positive direct current output potential $E_d$, and that a larger gating phase delay angle $\alpha$ would produce a less positive direct curent output $E_d$. It should also be noted that with these gating phase delay angles of $\alpha$, the voltage appearing across the load and the current supplied to the load are both positive. This means that power flow into the load is positive. This mode of operation with power flow from the alternating current source to the load is termed rectification.

Figure 4:
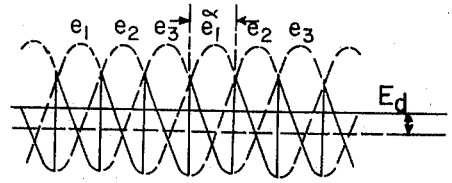
FIGURE 4 is a series of voltage versus time characteristic curves illustrating a second inverting mode of operation of the static cycloconverter power circuit of FIGURE 2.

The three line-to-neutral voltages $e_1$, $e_2$ and $e_3$ are shown by the dotted lines in FIGURE 3 and FIGURE 4. FIGURE 3 has been explained above. FIGURE 4 shows the same information as that supplied in FIGURE 3 except that a gating phase delay angle $\alpha$ of approximately 118 degrees is illustrated in FIGURE 4. It should be noted that with this gating phase delay angle of $\alpha$, the average output direct voltage $E_d$ is negative even though the SCR's 19, 21 and 22 shown in FIGURE 2 cannot carry negative current. The negative output direct current $E_d$ is possible because the load 25 has been assumed to be a counter EMF load which is negative at this gating phase delay angle of $\alpha$. In other words, a positive current is flowing into the load which has a negative voltage across it. The net power flow is therefore negative; and the power is actually flowing from the counter EMF load back into the alternating current source. This mode of operation with power flow from the load back to the alternating current source is called inversion. From an examination of FIGURES 3 and 4, it will be seen that the only practical values for the gating phase delay angle $\alpha$ (for the circuit of FIGURE 2) lie between zero and 180 degrees. From 180 degrees to 360 degrees, the SCR's 19, 21 and 22 have a reverse polarity voltage applied thereacross and cannot turn on.

The relationship for average output direct current voltage $E_d$ is given by the expression $$E_d = E_{do} \cdot \cos \alpha$$

where $E_{do}$ is the maximum positive voltage obtainable with the gating phase delay angle $\alpha$ equal to zero. If the gating phase delay angle $\alpha$ is varied from 90 degrees towards zero and back towards 90 degrees, the output voltage $E_{do}$ will go from zero to a maximum positive value and back to zero. If the gating phase delay angle $\alpha$ is then varied from 90 degrees towards 180 degrees and back to 90 degrees, the output voltage will then swing from zero to a maximum negative value and then back to zero. It will be appreciated therefore that if the gating phase delay angle $\alpha$ is swung back and forth at a predetermined rate (for example 400 cycles per second) the average output voltage $E_d$ will vary at the same 400 cycle per second rate. It will also be appreciated that if the input alternating current frequency is sufficiently high, the output frequency of 400 cycles per second is independent of the input frequency. Thus, it will be seen that an input alternating current at one frequency can be converted to an output alternating current at a different frequency using this principle of operation. This is a basic operating principle of static cycloconverter power circuits.

Figure 5:
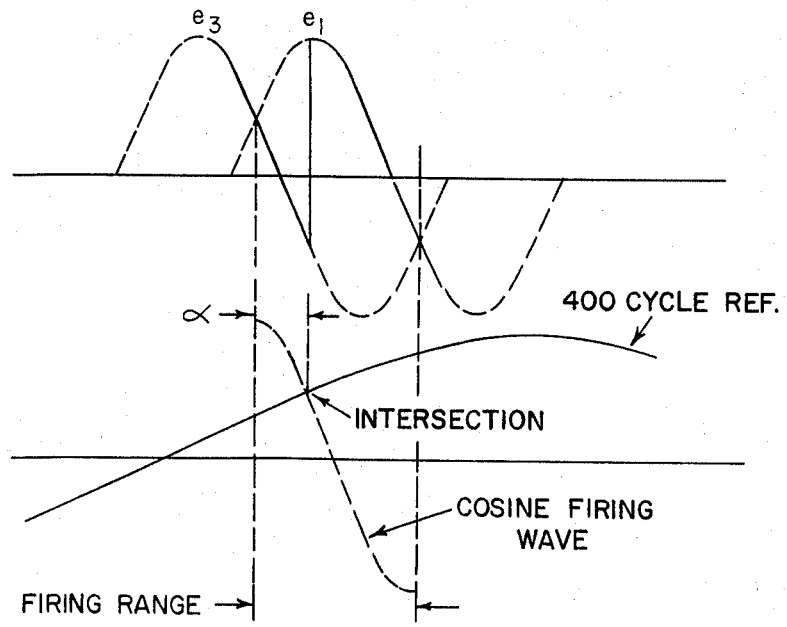
FIGURE 5 is a combined voltage versus time characteristic curve illustrating the relation between a supply firing wave and a 400 cycle reference wave employed to produce the proper conduction angle in one SCR.

In practical cycloconverter power circuits, the gating on of the SCR's can be accomplished by suitably designed gating circuits in which a cosine wave of the enabling, alternating current supply frequency is mixed with a 400 cycle reference wave as shown in FIGURE 5 of the drawings. By appropriate design, upon the 400 cycle reference wave exceeding the cosine enabling wave, a gating-on pulse is generated and a selected SCR is turned on. By using a cosine enabling wave (or a wave which is the integral of the line-to-line voltage), the output from cycloconverter power circuit can be made to be linear. This means that the average output voltage is proportional to the reference or input voltage. The importance of this characteristic is that the desired waveshape in the output at the power or kilowatt level is controlled by the waveshape of a reference signal wave which may be at low value signal levels in the milliwatt region.

Figure 6:
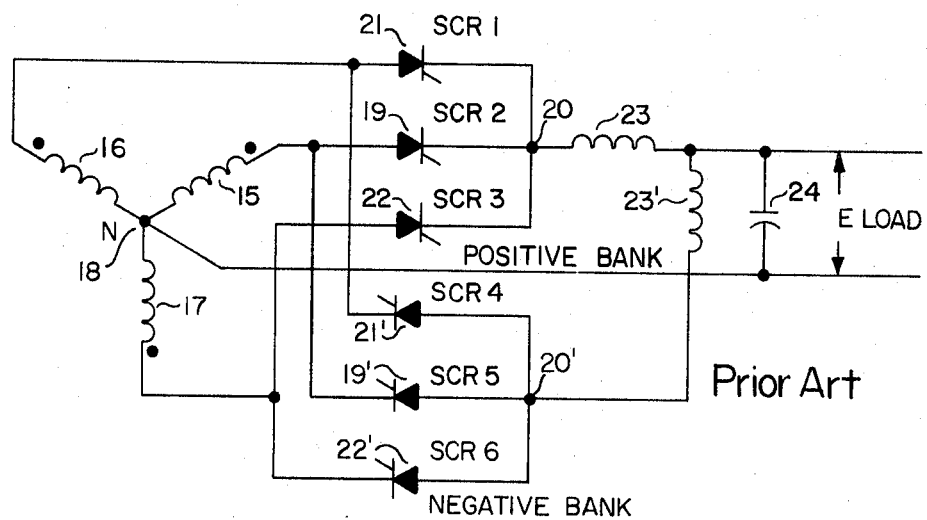
FIGURE 6 is a schematic circuit diagram of a complete, static cycloconverter power circuit for converting the three phase, alternating current input power of one frequency to single phase, alternating current output power at a different frequency.

The phase controlled SCR arrangement shown in FIGURE 2 is not a complete frequency changing cycloconverter since it has no ability to deliver negative load current. This is corrected by adding a second group of phase controlled SCR's as 19', 21' and 22' connected in reverse polarity, parallel circuit relationship to form a negative bank as shown in FIGURE 6 of the drawings. The reverse polarity, parallel connected SCR's 19', 21' and 22' have their cathodes connected to the windings 15, 16 and 17, respectively, and their anodes are connected in common through the filter inductor 23' across filter capacitor 24. With the circuit arrangement shown in FIGURE 6, the gating phase delay angles $\alpha$ of both the positive and negative banks of SCR's are programmed to produce a pair of substantially in phase, sinusoidally varying output voltages as shown in FIGURE 7 of the drawings. Both banks of SCR's are connected across the same load with the positive banks 19, 21, and 22 supplying the positive load current and the negative banks 19', 21' and 22' supplying the negative load current. From an examination of FIGURE 7 of the drawings, it can be seen that by properly phasing the two outputs of the positive and negative banks of SCR's, a combined single phase, converted output AC wave will be produced in the output, which, in the example cited, is a 400 cycle per second AC wave. With a linear converter and a good output filter to remove the rectifier ripple frequencies, the output AC power wave is a relatively good reproduction of the input 400 c.p.s. signal level reference wave. At this point, it should be noted that if a multiphase output is desired, for example a three phase output, three single phase cycloconverter power circuits can be supplied with three 400 c.p.s. reference waves which are 120 degrees phase displaced to produce the desired three phase output.

As stated above, with a reasonably linear cycloconverter system operating in accordance with the above principles and a good low pass filter 23, 23' and 24 to remove the rectifier ripple frequencies, the converted output power wave is a relatively good reproduction of the input signal level reference wave. It turns out that the requirement for the output filter, because it is located in the power portion of the cycloconverter, constitutes a significant part of the total weight of a static cycloconverter power circuit for a given output power rating. Thus, if any substantial reduction of weight is to be achieved in such static cycloconverter power circuits, the output filter constitutes one component of the overall circuit in which weight reduction must be achieved if the circuit is to be used in aircraft, guided missiles and other systems wherein size, weight and output power rating must be optimized.

One of the most attractive ways of saving output filter weight appears to be in the direction of increasing the number of input phases supplying the rectifier components (SCR's) of the cycloconverter. Increasing the input phases has the compound advantage of increasing the ripple frequency and reducing the amplitude of the unfiltered ripple. This is due to the fact that the output ripple frequency appearing at the output of the rectifier components increases directly proportionally with the number of input phases and the amplitude of the ripple also decreases in direct proportion to the number of input phases. This increase in ripple frequency, and reduction of amplitude, is best shown in FIGURE 8 of the drawings wherein a number of unfiltered output ripples for cycloconverter circuits having different numbers of input supply AC phases are shown. The waveshapes illustrated in FIGURE 8 are for a fixed gating phase delay angle of 90 degrees where the total output wave tends to be a sawtooth waveshape. From a consideration of FIGURES 8a through 8b it will be appreciated that both the height and width of the output ripple waveshape decrease in direct proportion to the number of input phases. If it is assumed that the sole purpose of the output filter is to suppress the ripple harmonics, and that the harmonics of the fundamental are held down by the basic linearity of the cycloconverter aided by feedback in the conventional manner, the product of the output filter inductance and capacitance for a given amount of ripple frequency is roughly inversely proportional to the fourth power of the number of input phases as shown in the below set forth table.

| Input phases | Ripple amplitude | Ripple frequency | Filter | |
|---|---|---|---|---|
| | | | $\sqrt{LC}$ | LC |
| 3 | 4 | 0.5 | 4 | 16 |
| 6 | 1 | 1.0 | 1 | 1 |
| 9 | 0.44 | 1.5 | 0.445 | 0.197 |
| 12 | 0.25 | 2.0 | 0.25 | 0.0625 |

Note, all factors are shown relative to the six phase input configuration in this table.

The obvious penalty for the above proposed saving of filter size by increasing the number of input phases is the requirement for more SCR's and their associated control circuits which increase the complexity of the cycloconverter but do not proportionally increase its weight, size or even its cost. Additionally, the normal or known manner of increasing the number of input phases to a cycloconverter greatly reduces the rectifier efficiency. For example, in a cycloconverter having a three phase supply as shown in FIGURE 6, the SCR's conduct over 120 degree intervals. In a straightforward, six phase, single way connection conventional in the art, the SCR's would conduct over a 60 degree interval. The result is that there is less efficient use of the SCR. This is not all, however, because for one cycle of output power, the number of commutations required for the SCR's is proportionally increased. In any practical cycloconverter power circuit there are commutation losses associated with each commutation of an SCR. Hence, in any straightforward increase in the number of input phases, the efficiency of the SCR's is decreased proportionally so as to in effect counterbalance any advantages obtained by increasing the number of input phases for increased output ripple frequency and lower output filter weight purposes.

Figure 9:
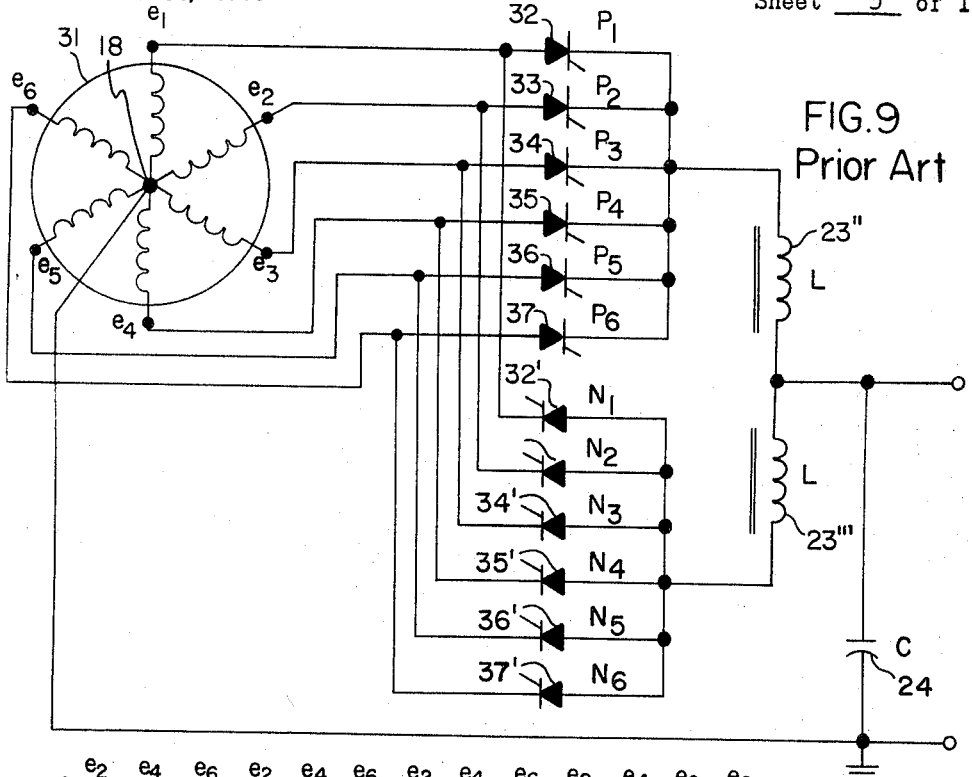
FIGURE 9 is a schematic circuit diagram of a conventional, six phase, single way, static cycloconverter power circuit.
Figure 10:
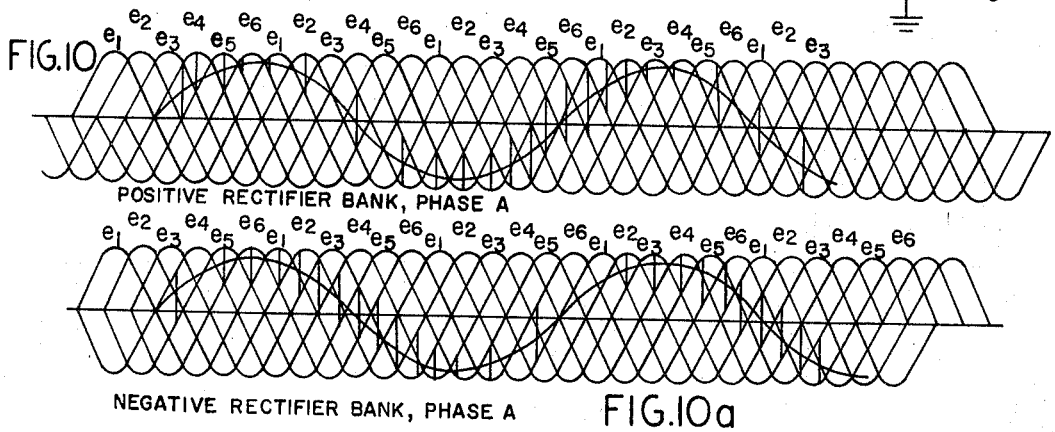
FIGURE 10 is a series of voltage versus time and current versus time characteristic curves illustrative of the operation of the circuit shown in FIGURE 9.

This problem, which arises in connection with a straightforward increase in the number of input phases to a cycloconverter, is best illustrated in connection with the circuit shown in FIGURE 9 of the drawings, and its associated characteristic operating waveshapes illustrated in FIGURE 10. The circuit shown in FIGURE 9 is a straightforward, six phase single way connection of the output from a six phase alternating current generator shown at 31 to a bank of positively connected SCR's 32 through 37 and to a bank of reverse polarity, parallel connected negative SCR's 32' through 37'. The output from the positive bank of SCR's 32 through 37 is supplied through a filter inductor 23" and capacitor 24 to a set of output terminals. One of the output terminals is grounded and is connected back to the neutral point of the six phase generator 31. Similarly, the negative bank of SCR's 32' through 37' is connected through an output filter inductor 23''' and filter capacitor 24 to the output terminals.

Figure 10B:
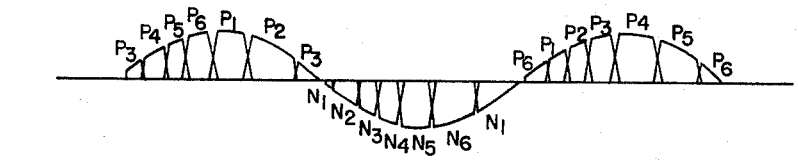

The output voltage waveshape appearing across the positive rectifier bank for the circuit of FIGURE 9 is shown in FIGURE 10a and FIGURE 10b illustrates the voltage waveshape for the negative rectifier bank. Curve 10c illustrates the output current developed by both rectifier banks and is particularly useful in depicting the conducting intervals for the individual SCR's in each of the rectifier banks. From an examination of FIGURE 10c it will be seen that SCR 34 (whose conducting interval is indicated as P3 in FIGURE 10c) is commutated by the SCR 35 (whose conduction interval is shown at P4), the SCR 35 is commutated by the SCR 36, etc. and so on through each bank of rectifiers in a manner described previously in detail in connection with FIGURE 2. Thus, it will be seen that six commutations of the SCR's in each bank are required for each cycle of the supply alternating current. Since there are commutation losses associated with each commutation of one of the SCR's 32 through 37 or 32' through 37', the commutation losses associated with the circuit are greatly increased. In addition to this undesirable aspect, it will be appreciated that the maximum possible average conduction interval for the individual SCR's in each bank is 360 degrees divided by 6 or 60 degrees. This constitutes a relatively inefficient use of the SCR's in each bank since they otherwise would be capable of conducting over a 180 degree interval as discussed previously.

Figure 11:
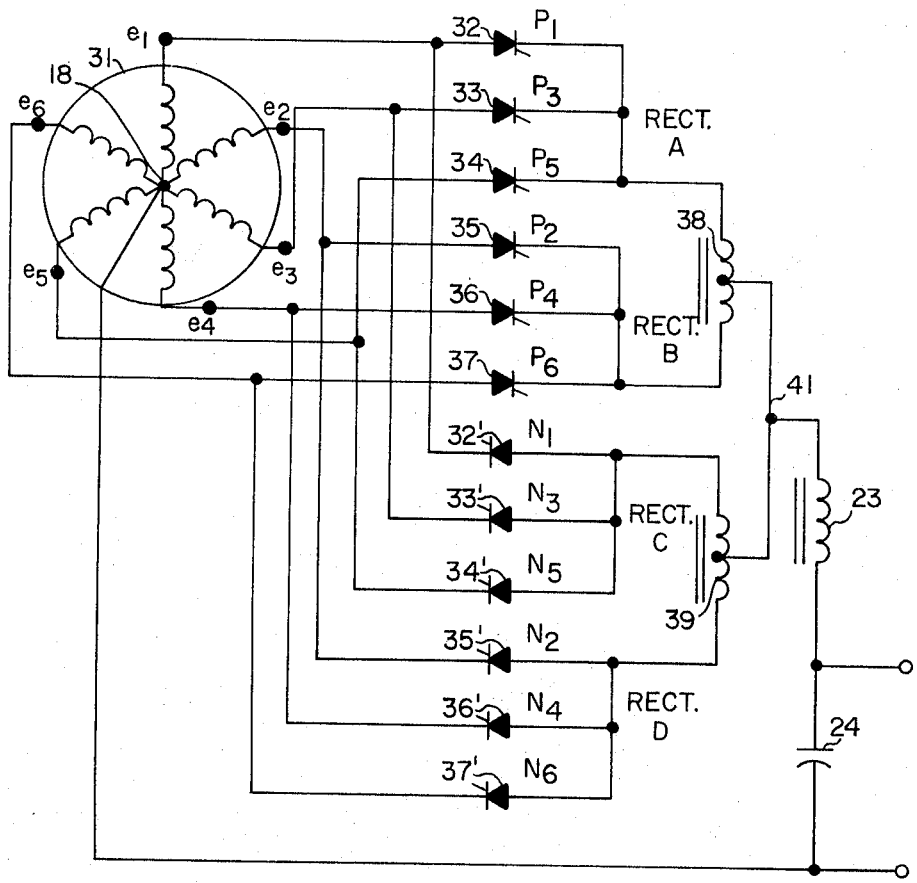
FIGURE 11 is a schematic circuit diagram of a new and improved six phase, static cycloconverter power circuit using interphase transformer connections between selected groups of switching power SCR's in accordance with the present invention.

In order to overcome the difficulties enumerated above, and at the same time achieve a significant decrease in the weight of static cycloconverter power circuits while retaining or improving the efficiency of operation of the circuits, the present invention was devised. FIGURE 11 of the drawings depicts one circuit constructed in accordance with the invention. The circuit shown in FIGURE 11 comprises a six phase cycloconverter with an interphase transformer output connection and a conventional six phase source of alternating current supply (shown at 31), which can comprise the windings of a six phase transformer or the stator windings of a rotating six phase alternating current generator having a common neutral point 18 that is grounded. The six phase source 31 includes a plurality of windings all of which have one terminal connected in common to the grounded neutral point 18 and have their respective output connection or terminal noted as $e_1$ through $e_6$.

The respective six phase outputs from the six phase source 31 are operatively coupled to a converter means that is comprised by a bank of positively connected SCR's 32 through 37 and a bank of negatively connected SCR's 32' through 37'. In effect, the individual SCR's in the bank of negatively connected SCR's 32' through 37' are connected in reverse polarity, parallel circuit relationship with the individual SCR in the bank of positively connected SCR's 32 through 37 that is connected to the same phase or supply winding in source 31. Consequently, the sets of positively and negatively connected SCR's, such as 32 and 32', constitute gated switch means for each phase of the multiphase alternating current power source 31. As will be described more fully hereinafter, gating circuit means (not shown in FIGURE 11) are operatively coupled to the multiphase power source 31 and to the control gate terminals of the SCR's 32 through 37 and 32' through 37' for gating on selected ones of the SCR's to cause them to conduct current therethrough at selected points in the phase of the alternating voltage supplied thereto from the multiphase source 31.

Interphase winding means shown at 38 and 39 serve to interconnect selected groups of the SCR's in each of the positive and negative banks of SCR's with the number of SCR's in each selected group being determined by the number of phases of the multiphase alternating current source 31 and the desired period of conduction for each of the SCR's. The interphase winding means are comprised by individual, linear inductive reactor windings 38 and 39 which are interconnected through a conductor 41 that also serves as an output connection to the output circuit means comprised by filter 23 and capacitor 24. From an examination of FIGURE 11, it will be appreciated that the sets of reverse polarity, parallel connected SCR's 32 through 37 and 32' through 37' in effect supply current in opposite directions. The interphase winding 38 comprises a first interphase winding that interconnects selected groups of the positively connected SCR's for supplying current in a first or positive direction. The second interphase winding 39 interconnects selected groups of the negatively connected SCR's 32' and 37' for supplying current in the opposite or negative direction. The conductor 41 then serves as a means for interconnecting the first and second interphase winding means 38 and 39. Further examination of FIGURE 11 will reveal that for the particular six phase system shown there are two reverse polarity parallel connected SCR's for each phase. The SCR's 32 through 37 in the positive rectifier bank which are designed to carry positive current are connected together into two separate groups identified as rectifier group A and rectifier group B. Each group is comprised of three SCR's each (SCR's 32-34 in Group A and 35-37 in Group B). The two groups of rectifiers in the positive bank are conductively and inductively coupled together through the first interphase winding 38. The SCR's 32' and 37' designed to carry negative current are connected together into two groups identified as rectifier Group C and rectifier Group D. There are three SCR's in each of rectifier Group C and rectifier Group D with the two groups being conductively and inductively coupled together through the second interphase winding 39. The first and second interphase windings 38 and 39 then are conductively interconnected through the conductor 41.

The six phase cycloconverter with interphase transformer shown in FIGURE 11 constitutes essentially two, three phase, single way phase controlled SCR circuits connected in parallel with the two, three phase, phase controlled SCR circuits being displaced 60 degrees with respect to each other to provide six phase output ripple. The interphase transformer windings 38 and 39 absorb the difference in the instantaneous outputs of the two parallel rectifier groups such as rectifier Group A and rectifier Group B, and each rectifier group supplies half the output current. Because the two rectifier groups such as rectifier Group A and rectifier Group B are displaced 60 degrees in their gating delay phase angle, a six phase source of supply 31 is necessary. This, of course, requires that the gating circuit means connected to the control gates of the individual SCR's in each group be so arranged with respect to each other to provide a desired firing order and conduction interval as will be explained more fully hereinafter. If desired, the interphase windings 38 and 39 may be designed with some leakage reactance both to limit equalizing current flow as hereinafter described between the positive and negative rectifier banks through conductor 41, and to supply some of the output filtering. When thus designed, the filter inductance 23 does not need to be as large as otherwise might be required for the six phase, single way circuit shown in FIGURE 9.

FIGURES 12 and 13 of the drawings illustrate the voltage waveshapes appearing across the output interphase windings 38 and 39 and supplied to output filter circuit means 23, 24. From a consideration of FIGURES 11 through 13, and a comparison of these figures to FIGURES 9 and 10, it will be seen that the SCR commutation sequence is entirely different for the two circuits. The order of gating-on the SCR's is depicted by the reference characters $P_1$ through $P_6$ and $N_1$ through $N_6$ shown in FIGURE 11. The particular gating-on order or sequence for the SCR's in each group can be provided by appropriate design of the gating-on circuit means or modulators which are connected to the gating electrodes of the several SCR's in each group as will be explained more fully hereinafter. From an examination of FIGURE 11, it will be seen that the order is such that if the SCR 32 is considered gated on, the next positive SCR to be gated on will be SCR 35 in rectifier Group B. Following rectifier 35, then rectifier 33 will be gated on in Group A. Gating-on of rectifier 35 will not serve to commutate SCR 32 since the two groups of rectifiers A and B are isolated from each other by the interphase winding 38. Thus, SCR 32 is allowed to conduct until SCR 33 is gated-on at which time it is commutated off in the previously described fashion. Thus, it will be appreciated that the interphase winding 38 absorbs the difference in the instantaneous outputs of the two groups of positive rectifiers A and B and the interphase winding 39 absorbs the difference in the instantaneous outputs of the two negative rectifier Groups C and D. This is best depicted in FIGURE 13 of the drawings. Referring to FIGURE 13, the unfiltered output of rectifier group A is shown in FIGURE 13a with a dotted line and the unfiltered output of rectifier group B is shown with a dash-dot line. The average value of the two groups of rectifiers which appears at the center tap of the interphase winding 38 (with the winding 39 open circuited and assuming no leakage reaction between the two windings), is shown by the solid line. It will be appreciated that the solid line waveform shown in FIGURE 13a is a six phase ripple while the ripple output frequency of each of the rectifier Groups A and B is only a three phase ripple. Thus, it can be appreciated that the circuit obtains the desirable effects of a higher output ripple frequency while allowing continued long conduction interval for the SCR's in the circuit. FIGURE 13b illustrates the same information for the negative bank of rectifiers comprised by rectifier Group C and rectifier Group D for the three different gating phase delay angles of 150 degrees, 120 degrees and 90 degrees. Since the negative bank of SCR's produce a positive voltage when the gating phase angle is retarded 90 degrees or more, to produce the same voltage that is produced by the positive bank, the phase delay angle for the negative bank is 180 degrees—the phase delay angle of the positive bank.

With the center taps of the two interphase windings 38 and 39 connected together by the conductor 41, the positive rectifier bank voltage and the negative rectifier bank voltage are connected across the leakage reactance of both windings. Since the ripple voltages overlap, a current will flow in the conductor 41 as shown in FIGURE 13c. This current is referred to as an equalizing current. The output of the positive bank is shown in solid line and the output of the negative bank is shown dashed. Here again the positive volt-seconds appear shaded and the negative volt-seconds are depicted by the dotted area. The volt-seconds causing equalizing currents obtained from the circuit are approximately the same as that obtained with a six phase, single way connection such as that shown in FIGURE 9 of the drawings. These advantages are obtained while at the same time providing 120 degree conduction for the SCR's thereby maximizing the efficiency of use of the SCR's, minimizing the commutation losses and at the same time obtaining the six phase output ripple which allows the use of a lightweight output filter. A further reduction in the size of the output filter can be realized by designing the interphase windings 38 and 39 with a certain amount of leakage reactance that is used to contribute to the filtering effect. For some circuits, the leakage reactance of the interphase windings may supply all of the filtering that is required.

Another essential feature of the invention is that in order to save on transmission line weight, the interphase windings 38 and 39 must be connected to the SCR rectifier banks as shown rather than being connected as part of the power supply in the manner of a conventional interphase power rectifier system. This allows the conductor supplying the individual rectifiers to be of minimum size and weight for a given power rating and in effect serves to concentrate the accumulated large power currents flowing in the cycloconverter into the output end of the cycloconverter where they should be.

Figure 14:
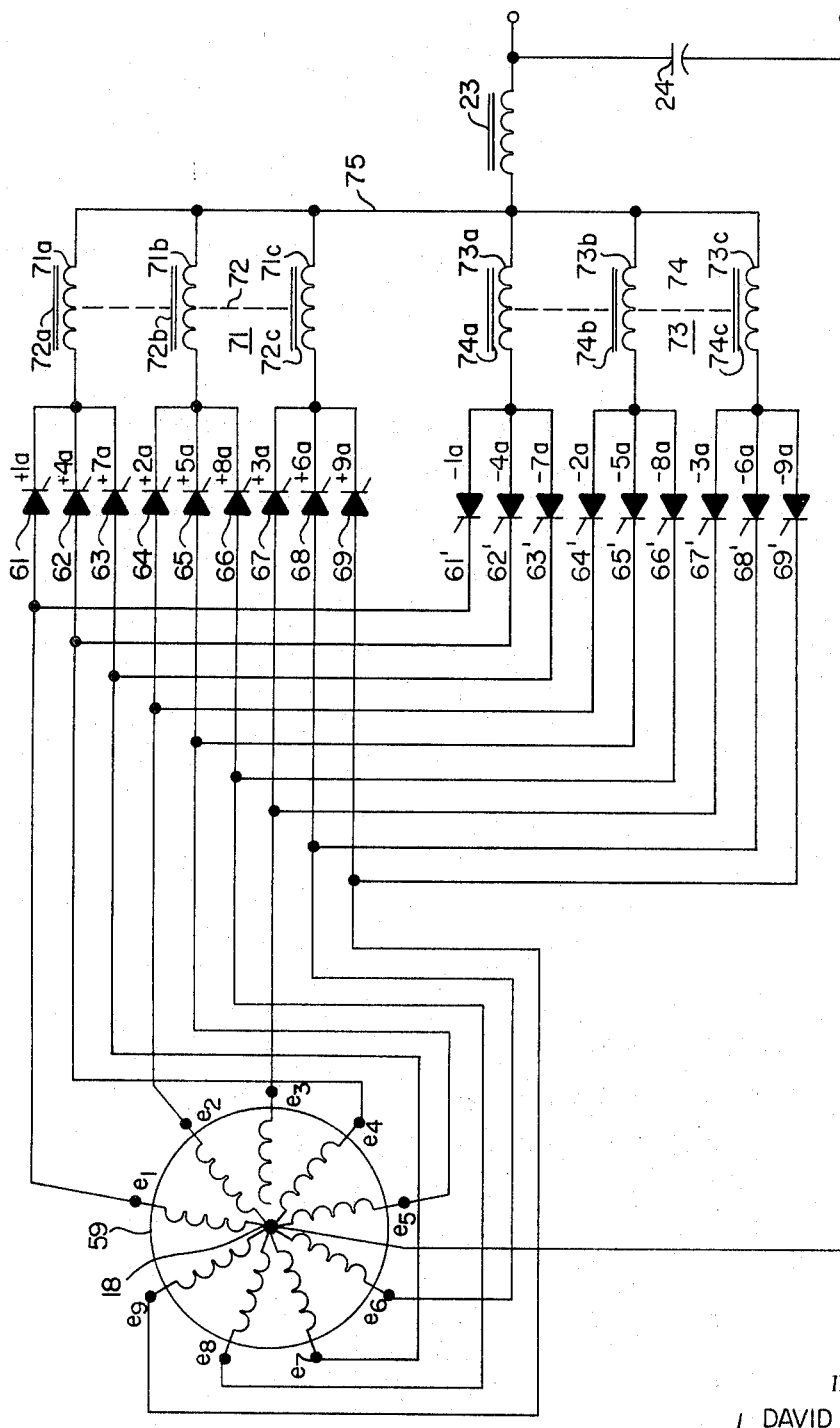
FIGURE 14 is a schematic circuit diagram of a nine phase, static cycloconverter power circuit providing 120 degree conduction for the switching power SCR's, and constructed in accordance with the present invention.

FIGURE 14 of the drawings illustrates a nine phase cycloconverter constructed according to the invention and which provides 120 degree conduction intervals for the SCR's employed therein. The system shown in FIGURE 14 is comprised by a nine phase source of alternating current electric power 59 having two parallel connected SCR's such as 61, 61' or 62, 62' for each phase. The SCR's 61 through 69 designed to carry positive current are connected together into three groups of three SCR's each through a first interphase coupling transformer 71 having three interphase windings 71a, 71b and 71c inductively and conductively intercoupled. The interphase winding 71a is conductively connected to the group of positive SCR's comprised by SCR's 61 through 63, the winding 71b is connected to the group comprised by SCR's 64 through 66 and the winding 71c is connected to the group including SCR's 67 through 69. The SCR's 61' through 69' designed to carry negative current are also connected together into three groups of three SCR's each through a second interphase coupling transformer 73. The second interphase coupling transformer 73 is comprised by three interphase winding elements 73a, 73b and 73c which are inductively and conductively intercoupled, there being one interphase winding connected to each group of three SCR's. The windings of the interphase coupling transformers 71 and 73 are interconnected by means of a conductor 75.

Each of the interphase coupling transformers 71 and 73 is wound on three legged core members 72 and 74, respectively, each having three separate legs 72a, 72b and 72c or 74a, 74b and 74c for supporting the interphase windings 71a through 71c and 73a through 73c, respectively. The three legged construction for the core members 2 and 74 provides a return flux pass through the remaining core legs for each of the individual core legs so as to balance the differential direct current magnetomotive force and thereby avoid saturation. The average direct current magnetomotive force of the three coils does not saturate the cores since the flux caused by this magnetomotive force must return by a long air path. As a consequence the interphase coupling transformers 71 and 73 will operate linearly to combine the positive and negative current pulses supplied thereto by the groups of SCR's in the positive and negative rectifier banks, and to supply the combined output current to the filter circuit 23, 24.

The order of gating on the SCR's 61 through 69 and 61' through 69' is indicated by the numeral $+1a$ through $+9a$ and $-1a$ through $-9a$ appearing alongside each of the respective SCR's in FIGURE 14. This order of firing or gating-on can be achieved by appropriate design of the gating-on circuit means connected to the control electrodes of the several SCR's. From a consideration of the firing order listed, it will be seen that each SCR is allowed to conduct for a 120 degree interval prior to commutation by the next associated SCR in the same group. Thus, the circuit of FIGURE 14 will operate to provide a nine phase output ripple and yet allow a conduction interval of 120 degrees for each of the SCR's used in the circuit. Thus, the higher output ripple frequency can be obtained without impairing the overall efficiency of the cycloconverter power circuit. As stated previously, the size of the output filter inductance and capacitance required for cycloconverter power circuits, is inversely proportional to the output ripple frequency. To be particular the product of the filter inductance and capacitance for a given amount of ripple is inversely proportional to the fourth power of the input phases. By reference to the table set forth in column 7 of the specification it will be seen that by increasing the number of input phases to nine using the circuit of FIGURE 14, a considerable reduction in the size of the output filter and inductance and capacitance can be realized. In this manner, the overall weight of the cycloconverter power system can be considerably reduced without impairing its overall operating efficiency.

Figure 15:
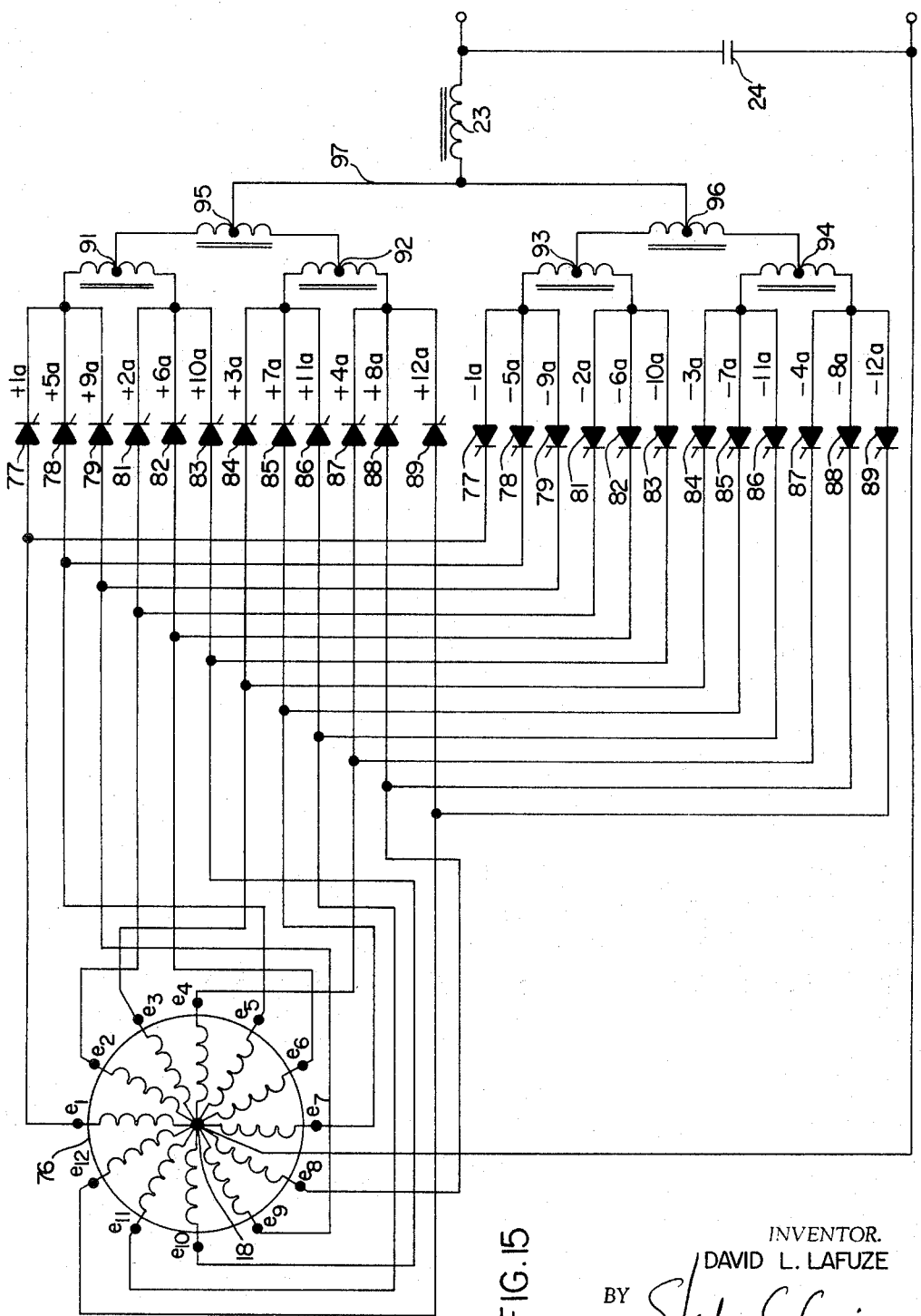
FIGURE 15 is a schematic circuit diagram of a twelve phase, static cycloconverter power circuit providing 120 degree conduction for the switching power SCR's and constructed in accordance with the present invention.

FIGURE 15 is a schematic circuit diagram of a 12 phase cycloconverter system providing 120 degree conduction intervals for the SCR's and constructed in accordance with the invention. The twelve phase cycloconverter system shown in FIGURE 15 is comprised by a source of twelve phase alternating current electric energy 76 having one end of the phase windings thereof connected in common to a grounded neutral point 18 and having the remaining ends of each of phase windings connected to two reverse polarity, parallel connected SCR's such as 77, 77' or 78, 78', etc. The SCR's 77 through 89 are designed to carry positive current and are connected together into four groups of three SCR's each forming two pairs of groups. One pair of groups of SCR's comprised by the SCR's 77 through 79 and 81 through 83 are inductively and conductively intercoupled through a first interphase winding 91 and a second pair of groups of positively connected SCR's 84 through 86 and 87 through 89 are inductively and conductively interconnected through a second interphase winding 92. The two interphase windings 91 and 92 are interconnected through a third interphase winding 95. Similarly, the negatively connected SCR's 77' through 89' are connected into four groups of three SCR's each forming two pairs of groups wherein the pairs of groups are comprised by SCR's 77' through 79' and 81' through 83' are inductively and conductively intercoupled through a fourth interphase winding 93. A second pair of groups of negatively connected SCR's 84' through 86' and 87' through 89' are conductively and inductively intercoupled through a fifth interphase winding 94. The fourth and fifth interphase windings 93, 94 are interconnected through a sixth interphase winding 96. The two interphase windings 95 and 96 are in turn interconnected through an interconnecting winding 97 which is connected to the filter inductor 23 and capacitor 24 for deriving the converted alternating current output.

The gating order or sequence of the positive and negative banks of SCR's through 89 and 77' through 89' are indicated by the subscript numbers $+1a$, $+5a$, $+9a$ or $-1a$, $-5a$, $-9a$, etc. recorded adjacent each SCR. These numbers indicate the gating-on order or sequence of that particular SCR. With a twelve phase source 76, there is a 30 degree interval or phase angle difference between each of the separate line-to-line phase voltages. From an examination of the firing order or sequence indicated, it will be seen that there are four such intervals or a 120 degree conduction interval provided for each of the SCR's by the connection shown in FIGURE 15. Here again, the interphase windings 91 and 92 absorb the difference in the instantaneous outputs of the two pairs of two groups of positive rectifiers to which they are connected and similarly the interphase windings 93 and 94 absorb the difference in the instantaneous outputs of the two pairs of two groups of negative SCR's to which they are connected. The average value of the current flowing in the two interphase windings 91 and 92 appears in conductor 95 and is coupled across the interphase winding 97, and the average value of the current flowing in the two interphase windings 93 and 94 appears in conductor 96 and is coupled across interphase winding 97. The average value of all four groups of rectifiers appears at the center of the interphase winding 97 and is supplied across the output filter inductor 23 and filter capacitor 24. Here again, it can be seen that by appropriate grouping of selected SCR's for interconnection by the several interphase windings 91–94 a high frequency output ripple can be developed, and yet provide extended conduction intervals for the SCR's with minimum commutation losses, etc.

FIGURE 16 of the drawings illustrates a modified form of a twelve phase cycloconverter system wherein the SCR's are grouped for 90 degree conduction periods. Referring to FIGURE 16, it will be seen that the positively connected SCR's 77 through 89 are grouped into three groups of four SCR's 77 through 81, 82 through 85 and 86 through 89. Each of these groups is connected to a respective interphase winding 71a', 71b' and 71c' of a first three leg core interphase coupling transformer 71' that is constructed similarly to the interphase coupling transformer shown with the 9 phase cycloconverter power circuit of FIGURE 14. The negative bank of SCR's 77' through 89' is similarly connected into three groups of four SCR's each with each group of four SCR's being connected to a respective interphase winding 73a', 73b or 73c' of a second interphase coupling transformer 73'. The windings of the two interphase coupling transformers 71' and 73' are interconnected through a conductor 98 which in turn is connected to the output filter inductor 23 and capacitor 24.

The gating-on order or sequence of the SCR's in each bank of rectifiers is indicated by the alpha-numerical character +1a, +4a . . . −9a, −12a located adjacent each SCR. From a consideration of the gating sequence there indicated, it will be appreciated that the SCR's in each group will be spaced apart in their conducting interval by a period of 90 degrees. Thus, in operation the circuit will develop a twelve phase output ripple to be smoothed by the output filter circuits 23, 24 and will provide 90 degree conducting intervals for each of the SCR's 77 through 89 and 77' through 89'. While the commutation losses associated with the circuit shown in FIGURE 16 will be somewhat higher than those encountered with the circuit shown in FIGURE 15, there will be certain applications wherein the shorter 90 degree conducting interval would be desired over the longer 120 degree conduction interval provided with the circuit of FIGURE 15. Additionally, the FIGURE 16 circuit shows how by appropriate grouping of the selected SCR's in each of the negative and positive banks of SCR's, and the use of a proper gating-on sequence, a variety of circuit arrangements are possible, providing high output ripple frequency together with a desired extended conducting interval.

FIGURE 17 is a functional block diagram of an overall cycloconverter system for developing three phase fixed frequency 400 cycle per second, alternating current power from an input six phase variable frequency, alternating current supply. The basic system is comprised by three main single phase cycloconverter power circuits 101a, 101b and 101c constructed in accordance with the invention for developing the three 400 cycle per second alternating current voltages $V_a$, $V_b$ and $V_c$ which are displaced in phase 120 degrees from each other. The combined output voltages $V_a$, $V_b$ and $V_c$ is the desired three phase, 400 cycle per second alternating current output. The cycloconverter power circuits 101a, 101b and 101c are each controlled by their individual associated gating-on circuit means or modulators 102a, 102b or 102c, respectively, and are provided with suitable feedback circuit means 103a, 103b and 103c for stabilizing the system and improving its linearity.

Each of the gating circuits or modulators 102a, 102b and 102c has supplied to the input thereof a gating-on signal derived from the output of a summing circuit 104a, 104b and 104c. Each of the summing circuits sums together a 400 cycle reference signal from a local oscillator and the feedback bias signal developed by its associated feedback circuit 103a, 103b and 103c. The summed output of these two signals is supplied to the input of the modulators 102a, 102b, and 102c at the supply generator frequency from a firing wave circuit shown at 105. The enabling firing waves developed by the firing wave circuit 105 in fact constitute a cosine enabling wave or the integral of the line-to-line voltage of the variable frequency alternating current supply potential applied to the cycloconverter power circuits 101a, 101b and 101c. These combined input signals are applied to the input of the gating circuits or modulators 102a, 102b and 102c for controlling the operation of these circuits in the manner described hereinbefore in detail in connection with FIGURES 5 through 7.

The main generator shown at 106 acts as a power supply for the cycloconverter power circuits 101a, 101b and 101c and the firing wave applied to each of the gating circuits or modulators are derived from its output by the firing wave circuit 105. The voltage of the main generator 106 is separately regulated by a simple voltage regulator 107 that derives its power from an auxiliary permanent magnet generator 108 through a power supply circuit 109. The permanent magnet generator 108 is driven off the same shaft as the main generator 106 and serves to supply the exciting field current for the main generator through the generator voltage regulator circuit 107 in a conventional manner. The output of the permanent magnet generator 108 also is used to supply power for control circuits, protective circuits, contact closing and opening, etc. If it is assumed that both the main generator and the permanent magnet generator 108 are shafted to and being driven by a variable speed motor such as an aircraft engine, automotive engine, etc., then it can be appreciated that the output of the main generator 106 will vary in frequency over quite a wide range as for example between 1,333 cycles per second and 2,666 cycles per second. The output alternating current generated by main generator 106 is at a relatively stable voltage however since the permanent magnet generator 108 is a wide speed range generator and the voltage regulator 107 operates effectively to regulate the output voltage of main generator 106.

The three reference signal waves (designated $V_R$ in FIGURE 17) which are supplied through the summing circuits 104 to the input of the modulators or gating circuits 102 in conjunction with the firing waves 105, must be precisely 400 cycles per second to the required accuracy, and must be precisely spaced apart with 120 electrical degrees of relative phase displacement. These reference signal waves should also have very low harmonic content, and should be easily and independently varied in amplitude in order to maintain a constant output voltage on each phase. These requirements are met by a precision 2400 cycle per second oscillator 111 having its output coupled through a digital phase splitter 112, three individual amplitude clippers 113 and three precision filters 114. The resultant output signals $V_R$ are applied to the inputs of each of the summing circuits 104a, 104b and 104c. The clippers 113 are controlled by individual phase voltage regulators 115.

The exact construction of the oscillator 111 will vary for different required accuracy, and if the circuit is to be used in parallel with other similar systems, it should be of a type which can be easily changed in frequency in response to load division signals applied thereto. For a more detailed description of digital phase splitter 112, reference is made to U.S. Patent No. 3,241,033 issued Mar. 15, 1966, for a Multiphase Wave Generator Utilizing Bistable Circuits and Logic Means, L. R. Peaslee and Murray Rosenblatt, inventors. For a more detailed description of amplitude clippers 113 and individual phase voltage regulators 115, reference is made to U.S. Patent No. 2,922,052, issued Jan. 19, 1960, for a Selsyn Exciter for Position Programing Control System, L. R. Peaslee, inventor. Both of these patents are assigned to the General Electric Company.

In operation the output of oscillator 111 is a train of pulses which feed into the digital phase splitter 112. The design of digital phase splitter 112 is such that its output provides three 400 cycle per second square waves which are exactly 120 electrical degrees apart in relative phase displacement. Precision in the operation of this circuit is inherently provided by the fact that the beginning of each half cycle of the 400 cycle per second output square wave is initiated by the 2,400 cycle per second oscillator pulses. The 400 cycle per second, phase shifted square waves appearing at the output of the digital phase shifter 112 are then clipped in amplitude by clippers 113 at a level indicated by the individual phase voltage regulators comprising a part of the circuit 115. The resultant clipped square wave is then passed into the precision filter 114 where all harmonics are reduced to less than 1%. The amplitude of the resultant 400 cycle per second reference waveshapes $V_R$ supplied to summing circuits 104 are then proportional to the amplitude of the square waves applied to the input of the filter 114.

It has been determined that improved linearity is obtained by using negative feedback around each of the power circuits and modulators. This negative feedback provided by the circuit elements 103a, 103b and 103c reduces low frequency harmonics (such as the third, fifth and seventh) and also minimizes dips and overshots upon application and removal of the load, and results in improving the overall stability of the system. It also helps to maintain the output phase displacement of 120 degrees between the three output phases even with unbalanced loads applied to the system.

The main generator 106 for the variable speed constant frequency system shown in FIGURE 17 should supply approximately 50 to 60% more kva. than the system rating. This requirement is due to the fact that the SCR's in the cycloconverter power circuit are gated on at phase delay angles of $\alpha$ which are appreciable. Hence, since all of the available generator voltage is not used during each generator cycle, the load power factor appears low to the generator and more kva. is required of the generator than is used in the output. The generator frequency must be high enough to provide a large number of SCR firings in one half cycle (measured at the 400 cycle per second reference), in order to produce a smooth wave in the output. An input to output frequency ratio of approximately 3 to 1 at minimum generator speeds (frequency) is generally adequate for cycloconverter power circuits of the type herein disclosed.

It should be understood that power circuits 101a, 101b and 101c shown in FIGURE 17 may each comprise the single phase converter circuit shown in FIGURE 11. The firing waves from circuit 105 are combined in modulator 102a with the one phase of the reference signal from oscillator 111 coupled thereto by phase splitter 112, clipper 113, filter 114 and summing circuit 104a in the same manner shown in FIGURE 5. With the modulator 102a producing the firing waves, as has been described, the appropriate SCR's in power circuit 102a are gated on to generate an output voltage as shown in FIGURE 12. Each of the modulators 102b and 102c cooperates with its respective power circuits 101b and 101c to produce substantially identical outputs, each being displaced in phase by 120 degrees from each other and from the output $V_A$.

From the foregoing description it can be appreciated that the present invention provides new and improved single phase and multiphase cycloconverters and static cycloconverter power circuits using interphase windings to interconnect selected numbers of phase controlled silicon controlled rectifiers into groups in a manner so as to obtain high output ripple frequencies together with extended conduction periods for the phase controlled silicon controlled rectifiers. By reason of these features, the new and improved cycloconverter can be built with a minimum weight of filter components and transmission line interconnections while at the same time either not impairing or, in some instances, simultaneously improving the efficiency of operation of the overall cycloconverter system.

Having described several embodiments of new and improved cycloconverters and cycloconverter power circuits constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. A new and improved cycloconverter including in combination a source of multiphase electric power, converter means coupled to said multiphase source of electric power, said converter means comprising gated switch means for each phase of the multiphase power source and phase controlled gating circuit means operatively coupled to the multiphase power source and to the gated switch means for gating on selected ones of the switch means to cause the same to conduct current therethrough at selected points in the phase of the alternating voltage supplied thereto from the multiphase power source, interphase winding means interconnecting selected groups of like-polarity connected gated switch means, the number of gated switch means in each selected group being determined by the number of phases of the multiphase power source and the desired period of conduction for each of the switch means, said gating circuit means gating on at least one like-polarity connected gated switch means of a different like-polarity connected group intermediate the gating on of a succeeding gated switch means in the same group with the gated switch means in the same group being sequentially gated-on repetitively, and output circuit means coupled to the interphase winding means for deriving the converter output alternating current.

2. A cycloconverter according to claim 1 wherein the gated switch means comprise at least a pair of gate controlled conducting devices for each phase of said multiphase power source, one gate controlled conducting device of a pair being responsive to positive half cycles from said power source and the other gate controlled conducting device of a pair being responsive to negative half cycles from said power source so that the gate controlled conducting devices in a pair conduct current in opposite directions.

3. A cycloconverter according to claim 2 wherein the interphase winding means is comprised by first interphase winding means interconnecting selected first groups of gate controlled conducting devices for supplying current in a first direction and second interphase winding means interconnecting selected second groups of gate controlled conducting devices for supplying current in the opposite direction, and means conductively interconnecting the first and second interphase winding means.

4. A cycloconverter according to claim 3 wherein the output circuit means includes filter means comprised in whole or in part by leakage reactance of the first and second interphase windings.

5. A cycloconverter according to claim 1 wherein the gated switch means comprise a pair of silicon controlled rectifiers for each phase of said multiphase source.

6. A cycloconverter according to claim 5 wherein the multiphase source of electric power supplies at least six phases, there being two silicon controlled rectifiers for each phase with the silicon controlled rectifiers connected to carry positive current being connected together into two groups of three each with each group being conductively and inductively coupled together through a first interphase winding and the silicon controlled rectifiers connected to carry negative current being connected together into two groups of three each with each group being conductively and inductively coupled together through a second interphase winding, and the first and second interphase windings being conductively interconnected.

7. A cycloconverter according to claim 6 wherein the source of multiphase electric power is a variable frequency source and the converted output alternating current is at a constant fixed frequency.

8. A cycloconverter according to claim 5 wherein the multiphase source of electric power supplies at least nine phases, there being two silicon controlled rectifiers for each phase with the silicon controlled rectifiers connected to carry positive current being connected together into three groups of three each through a first interphase coupling transformer having three interphase windings inductively and conductively intercoupled, there being one interphase winding connected to each group of three silicon controlled rectifiers, and the silicon controlled rectifiers connected to carry negative current being connected together into three groups of three each through a second interphase coupling transformer having three interphase windings inductively and conductively intercoupled, there being one interphase winding connected to each group of three silicon controlled rectifiers, and the first and second interphase coupling transformers being conductively interconnected.

9. A cycloconverter according to claim 5 wherein the multiphase source of electric power supplies at least twelve phases, there being two silicon controlled rectifiers for each phase with the silicon controlled rectifiers connected to carry positive current being connected together into four groups of three each forming two pairs of groups with each pair of groups being inductively and conductively intercoupled through first and second interphase windings, the first and second interphase windings being inductively and conductively intercoupled through a third interphase winding, and the silicon controlled rectifiers connected to carry negative current being connected together into four groups of three each forming two pairs of groups with each pair of groups being inductively and conductively intercoupled through fourth and fifth interphase windings, the fourth and fifth interphase windings being inductively and conductively intercoupled through a sixth interphase winding, the third and sixth interphase windings being conductively interconnected.

10. A cycloconverter according to claim 5 wherein the multiphase source of electric power supplies at least twelve phases, there being two silicon controlled rectifiers for each phase with the silicon controlled rectifiers connected to carry positive current being connected together into three groups of four each through a first interphase coupling transformer having three interphase windings inductively and conductively intercoupled, there being one interphase winding connected to each group of four silicon controlled rectifiers, the silicon controlled rectifiers connected to carry negative current being connected together into three groups of four each through a second interphase coupling transformer having three interphase windings inductively and conductively intercoupled, there being one interphase winding connected to each group of three silicon controlled rectifiers, and the first and second interphase coupling transformers being conductively interconnected.

11. A cycloconverter for producing a converted multiphase alternating current output from an input source of multiphase alternating current electric power including in combination a plurality of single phase cycloconverters according to claim 5 each connected to the input source of multiphase alternating current power, and a common reference frequency source coupled to the gating circuit means of each of the single phase cycloconverters, the reference signals supplied to the single phase cycloconverters by said reference frequency source being separated in phase by a phase angle determined by the desired number of output phases.

12. A cycloconverter for producing a converted three phase alternating current output from an input source of six phase alternating current electric power including in combination three single phase cycloconverters according to claim 5 each connected to the input source of six phase alternating current power, and a common reference frequency source coupled to the gating circuit means of each of the single phase cycloconverters, the reference signals supplied to the single phase cycloconverters by said reference frequency source being separated in phase by a phase angle of 120 degrees.

13. A cycloconverter for producing a converted three phase alternating current output from an input source of six phase alternating current electric power including in combination three single phase cycloconverters according to claim 6 each connected to the input source of six phase alternating current power, and a common reference frequency source coupled to the gating circuit means of each of the single phase cycloconverters, the reference signals supplied to the single phase cycloconverters by said reference frequency source being separated in phase by a phase angle of 120 degrees.

14. A cycloconverter according to claim 13 wherein the input six phase source of alternating current comprises a six phase, variable frequency, rotating generator and the converted output alternating current is at a constant fixed frequency.

15. In a static cycloconverter power circuit including a multiphase power source, an arrangement of gated switch means for each phase of said multiphase power source, phase controlled gating circuit means coupled to the multiphase power source and connected to the gated switch means for gating on selected ones of the gated switch means to cause the same to conduct current therethrough at selected points in the phase of the alternating voltage supplied thereto by said power source, the improvement comprising interphase winding means interconnecting selected numbers of like-polarity gated switch means into a plurality of groups, the selected number of like-polarity gated switch means in each group being determined by the number of phases of said multiphase power source and the desired period of conduction for each of the gated switch means, said gating circuit means gating on at least one like-polarity connected gated switch means of a different like-polarity connected group intermediate the gating on of a succeeding gated switch means in the same group with the gated switch means in the same group being sequentially gated-on repetitively, and output circuit means coupled to the interphase winding means for deriving the converter output alternating current.

16. The arrangement according to claim 15 wherein the gated switch means comprise sets of gate controlled conducting devices for supplying current in opposite directions and the interphase winding means is comprised by first interphase winding means interconnecting selected first groups of gate controlled conducting devices for supplying current in a first direction and second interphase winding means interconnecting selected second groups of gate controlled conducting devices for supplying current in the opposite direction, and means interconnecting the first and second interphase winding means.

17. The arrangement according to claim 16 wherein the gate controlled conducting devices comprise silicon controlled rectifiers.

18. The arrangement according to claim 17 wherein the output circuit means includes filter means comprised in whole or in part by leakage reactance of the first and second interphase winding means.

19. The arrangement according to claim 17 wherein the apparatus is designed for use with a multiphase source of electric power which supplies at least six phases, there being two silicon controlled rectifiers for each phase with the silicon controlled rectifiers connected to carry positive current being connected together into two groups of three each with each group being conductively and inductively coupled together through a first interphase winding and the silicon controlled rectifiers connected to carry negative current being connected together into two groups of three each with each group being conductively and inductively coupled together through a second interphase winding, and with the first and second interphase windings being conductively interconnected.

20. A static cycloconverter power circuit for producing a converted three phase alternating current output from an input source of six phase alternating current power including in combination three single phase cycloconverter arrangements according to claim 19 each connected to said source of six phase alternating current power, and a common reference frequency source coupled to the gating circuit means of each of the single phase cycloconverters, the reference signals supplied to the single phase cycloconverters by said reference frequency source being separated in phase by a phase angle of 120 degrees.

21. The arrangement according to claim 17 wherein said multiphase power source supplies at least nine phases, there being two silicon controlled rectifiers for each phase with the silicon controlled rectifiers connected to carry positive current being connected together into three groups of three each through a first interphase coupling transformer having three interphase windings inductively and conductively intercoupled, there being one interphase winding connected to each group of three silicon controlled rectifiers, and the silicon controlled rectifiers connected to carry negative current being connected together into three groups of three each through a second interphase coupling transformer having three interphase windings inductively and conductively intercoupled, there being one interphase winding connected to each group of three silicon controlled rectifiers, and the first and second interphase coupling transformers being conductively interconnected.

22. The arrangement according to claim 17 wherein said multiphase power source supplies at least twelve phases, there being two silicon controlled rectifiers for each phase with the silicon controlled rectifiers connected to carry positive current being connected together into four groups of three each forming two pairs of groups with each pair of groups being inductively and conductively intercoupled through first and second interphase windings, the first and second interphase windings being inductively and conductively intercoupled through third interphase windings, and the silicon controlled rectifiers designed to carry negative current being connected together into four groups of three each forming two pairs of groups with each pair of groups being inductively and conductively intercoupled through fourth and fifth interphase windings, the fourth and fifth interphase windings being conductively intercoupled through sixth interphase windings, the third and sixth interphase windings being conductively interconnected.

23. The arrangement according to claim 17 wherein said multiphase power source supplies at least twelve phases, there being two silicon controlled rectifiers for each phase with the silicon controlled rectifiers connected to carry positive current being connected together into three groups of four each through a first interphase coupling transformer having three interphase windings inductively and conductively intercoupled, there being one interphase winding connected to each group of four silicon controlled rectifiers, the silicon controlled rectifiers connected to carry negative current being connected together into three groups of four each through a second interphase coupling transformer having three interphase windings inductively and conductively intercoupled, there being one interphase winding connected to each group of three silicon controlled rectifiers, and the first and second interphase coupling transformers being conductively interconnected.

References Cited

UNITED STATES PATENTS

| | | | |
|---|---|---|---|
| 3,152,297 | 10/1964 | Peaslee | 321—61 |
| 3,178,630 | 4/1965 | Jessee | 321—7 |
| 3,256,244 | 6/1966 | Byloff et al. | |
| 3,289,070 | 11/1966 | Caldwell et al. | |
| 3,302,093 | 1/1967 | Yarrow | 321—7 |
| 3,350,621 | 10/1967 | Caldwell. | |

FOREIGN PATENTS 1,339,607   9/1963   France.

OTHER REFERENCES

Rectifier Circuits, Theory And Design by J. Schaefer, pub., John Wiley, New York, 1965, Sci. Lib.

JOHN F. COUCH, *Primary Examiner.*

G. GOLDBERG, *Assistant Examiner.*

U.S. Cl. X.R.

307—231, 241, 262, 269; 321—26, 61, 69